United States Patent [19]

Lammers

[11] 3,952,309

[45] Apr. 20, 1976

[54] DOPPLER PERSPECTIVE NAVIGATION SYSTEM EMPLOYING THE COMPARISONS WITH A REFERENCE SOURCE OF SIGNAL PHASES RECEIVED ON AN AIRCRAFT BY A PLURALITY OF SENSORS

[75] Inventor: Uve H. W. Lammers, Chelmsford, Mass.

[73] Assignee: The United States of America as represented by the Secretary of the Air Force, Washington, D.C.

[22] Filed: May 21, 1974

[21] Appl. No.: 471,933

[52] U.S. Cl............................ 343/108 R; 343/102; 343/112 R; 235/150.22
[51] Int. Cl.².......................................... G01S 1/16
[58] Field of Search........ 343/108 R, 112 R, 112 C, 343/102; 235/150.22, 150.26

[56] References Cited
UNITED STATES PATENTS

| 2,226,860 | 12/1940 | Greig | 343/118 |
| 2,463,095 | 3/1949 | Wight et al. | 343/108 R |
| 3,237,195 | 2/1966 | Schiffman | 343/112 R |
| 3,503,071 | 3/1970 | Earp | 343/112 R |

Primary Examiner—Maynard R. Wilbur
Assistant Examiner—S. C. Buczinski
Attorney, Agent, or Firm—Joseph E. Rusz; Julian L. Siegel

[57] ABSTRACT

A perspective display of a runway is obtained on an aircraft by transmitting signals from selected marker positions about the runway. A plurality of sensors are positioned on the aircraft with each sensor being compared to a reference frequency. The comparisons are made measuring the accumulated phase difference during a given time with these phase differences being equivalent to distances which are then fed to a computer and displayed as a perspective view.

4 Claims, 13 Drawing Figures

DOPPLER PERSPECTIVE NAVIGATION SYSTEM EMPLOYING THE COMPARISONS WITH A REFERENCE SOURCE OF SIGNAL PHASES RECEIVED ON AN AIRCRAFT BY A PLURALITY OF SENSORS

BACKGROUND OF THE INVENTION

This invention relates to navigation systems, and more particularly to a technique for electronically obtaining a perspective display aboard a linearly moving vehicle.

Perspective perception of space is very natural to man. The eye recognizes size, distance and orientation of objects, as well as their spatial arrangement on the basis of angular dimensions. Angular inputs to the brain and a vast amount of stored information permit man to navigate through his three-dimensional environment.

Electronic navigational aids have in many respects improved and supplemented human navigation capabilities, but in general they do not provide information which is optimally interfaced with man's brain. They are not a substitute for perspective vision.

The present invention is a perspective navigation system, which provides basically the same information as vision does. A need for such a system is obvious in several practical situations, such as an aircraft landing under adverse weather conditions. Instrument landing systems are well known and improved versions are presently being developed, but known systems operate on the principle of a glide path and provide measurements of the aircraft deviation thereof.

The system disclosed herein is unlike former navigation systems in that it displays a perspective view of the properly marked runway, similar to the way in which its light markers are visible at night, which offers many advantages. Firstly, a difficulty arises with existing instrument landing systems when a pilot landing his aircraft has to make the transition from his instrument readings to visual perception of the runway in the short time interval before touchdown. Such a transition is eliminated by the present invention. Secondly, the pilot does not only receive at a glance, information on the aircraft position, but also its attitude. Thirdly, the system operates with higher redundancy than present instrument landing systems as it does not simply provide meter readings, but a perspective display of a structure, which must agree with the pilot's memory to be trusted. This will protect against multipath propagation errors from which present instrument landing systems suffer.

In my copending application, filed on even date herewith, there is disclosed a perspective navigation system in which a plurality of sensors detects signals from runway marker beacons and a first detected signal is compared to a reference signal and the other detected signals are compared to the first. However, in the present invention all of the detected signals are compared to a reference signal. In addition, the present invention is based on different mathematical formulas.

SUMMARY OF THE INVENTION

This invention produces the perspective display of a series of markers and hence the spatial orientation of a pilot with respect to this a priori known configuration of markers.

Two different schemes can be used to determine sensor velocity and marker-sensor separation from a system of three sensors triangularly arranged by measuring instantaneous doppler shifts at three equally spaced instances of time or by measuring the total doppler integral over three consecutive time intervals of equal length. A constant sensor velocity is required during the measurements. The perspective position of the marker is displayed in a plane after determining the marker coordinates by triangulation. Multiple markers make use of separate frequencies and are received by the same sensor antennas but then distinguished by frequency before further processing or, a single frequency could be transmitted from the markers but one marker at a time and is processed by a computer accordingly.

It is therefore an object of this invention to provide a navigation method and system that displays perspective information.

It is another object to provide a perspective navigation method and system that does not depend on deviations from a glide path.

It is still another object to provide a perspective navigation system that eliminates the need for a pilot when landing an aircraft to make the transition from instrument landing to visual perception of the runway.

It is yet another object to provide a perspective navigation system that permits the pilot to simultaneously determine both the position and the attitude of the aircraft.

It is still another object to provide a perspective navigation system that operates with a higher redundancy than instrument landing systems used in the past.

These and other objects, advantages and features of the invention will become more apparent from the following description taken in connection with the illustrative embodiment of the accompanying drawings in which like reference characters refer to like elements throughout the several views.

DESCRIPTION OF THE DRAWINGS

FIG. 1b shows a sequence of display representations of the aircraft approach as shown in FIG. 1a;

FIG. 2b shows a sequence of display representation of the aircraft's approach as shown in FIG. 2a;

FIG. 3b shows a sequence of display representations of the aircraft's approach as shown in FIG. 3a;

FIG. 4b shows a sequence of display representations of the aircraft's approach as shown in FIG. 4a;

DETAILED DESCRIPTION OF THE PREFERRED EMBODIMENT

Considering a runway as a fairly narrow but very long rectangle, which is normally approached at low altitude from the narrow side, it is sufficient to identify this structure by a minimum of three markers. Two of the markers are located at either corner of the approach end of the runway and the third is located at its far end, either at one corner or centered between the two corners. The position of the third marker is of minor importance since perspective practically contracts the far end into one point. Any number of additional markers can be placed along the runway, but is not considered here since the long narrow triangle permits unambiguous perspective identification of the pilot's position from any point within the hemisphere.

Figure 1A:
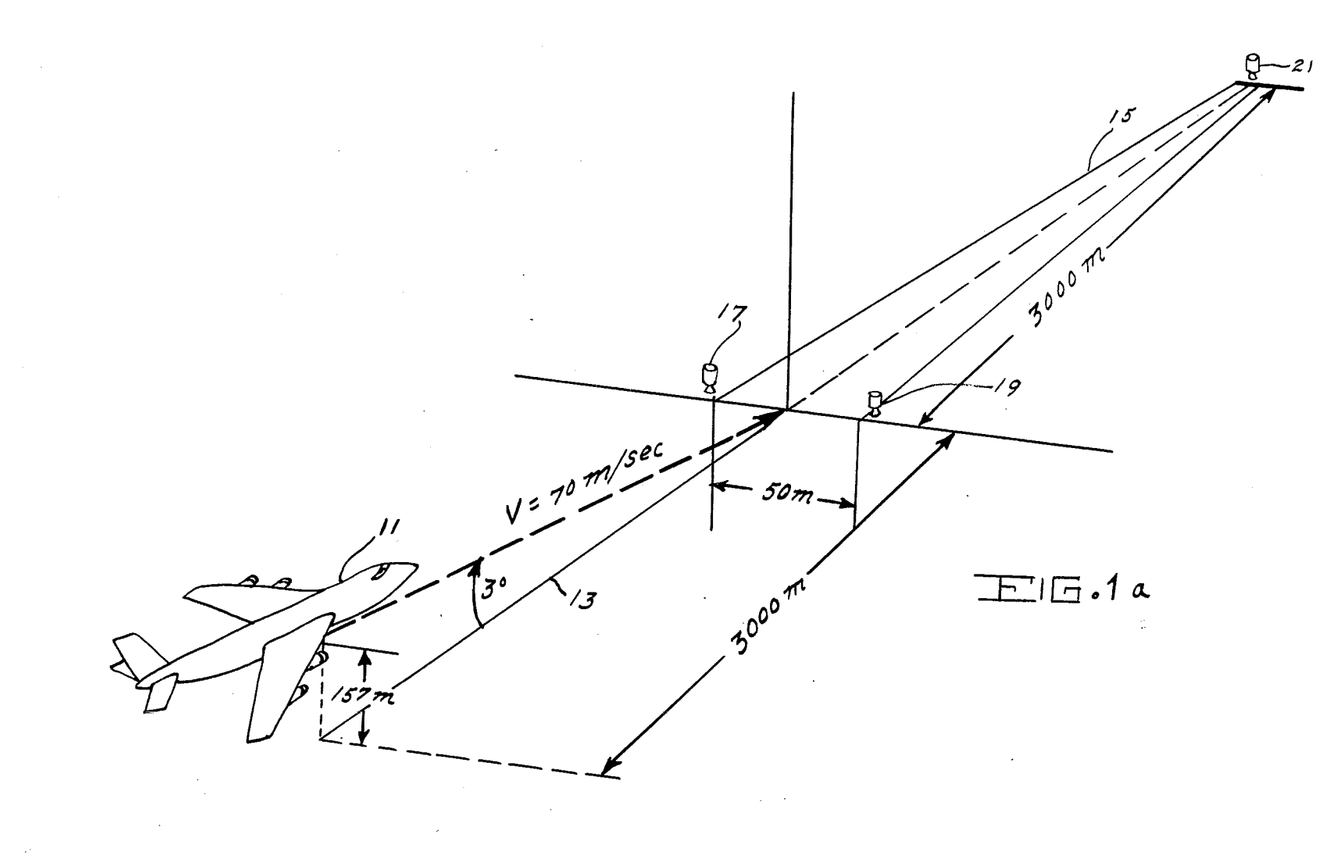
FIG. 1a is a perspective view of an aircraft in a correct approach to the runway.
Figure 1B:
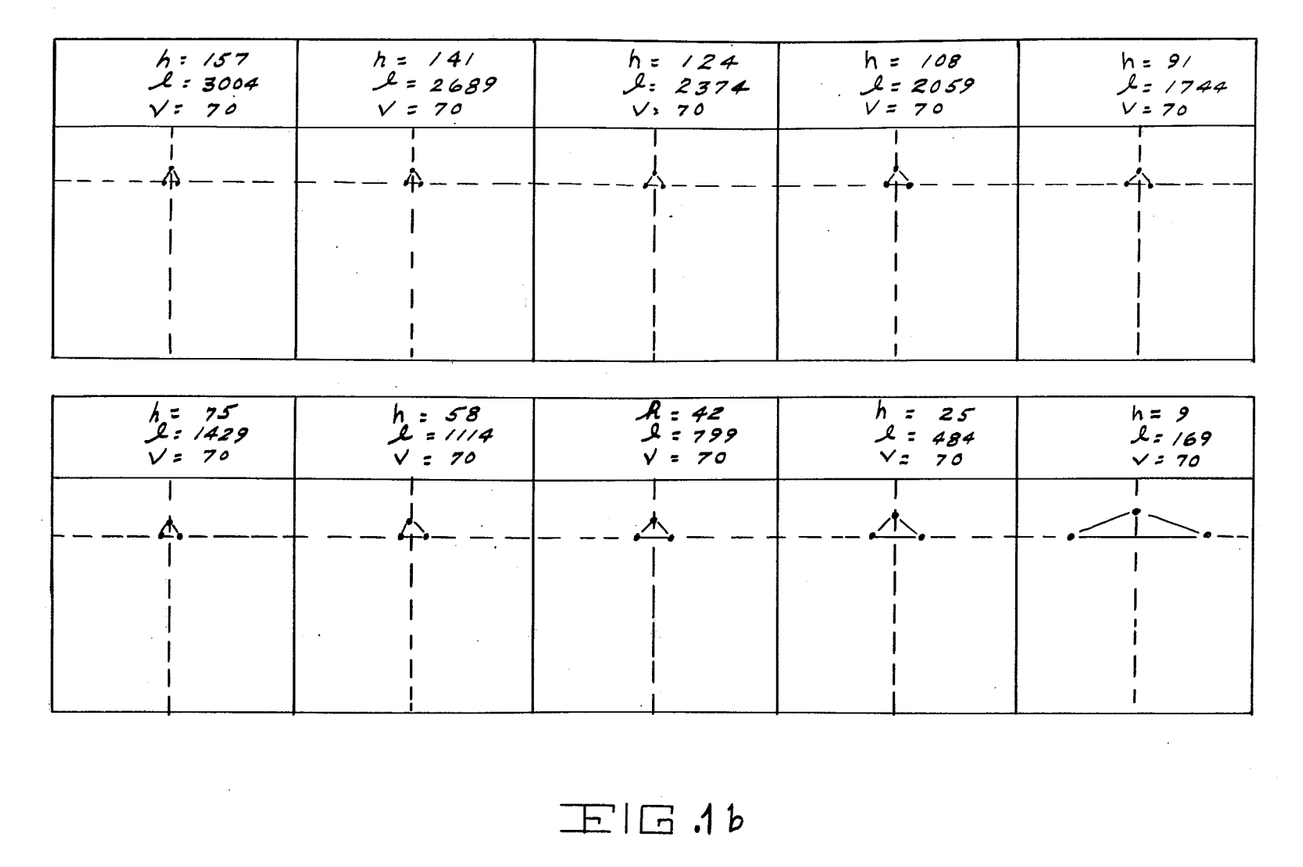

Referring to FIG. 1a, there is shown a perspective view of aircraft 11 making a correct approach on center line 13 of runway 15. Aircraft 11 has a constant velocity of 70 meters per second and is shown making a 3° glide slope. The runway is marked by radial beacon markers 17 and 19 at the front of runway 15 and radial beacon marker 21 at the rear. FIG. 1b shows progressive views of a display as aircraft 11 makes an approach as shown in FIG. 1a where $h$ is the height in meters. $l$ is the distance in meters from aircraft 11 to the beginning of runway 15, and $v$ is the velocity of aircraft 11 in meters per seconds. The three dots represent radial beacon markers 17, 19 and 21 and offer a perspective presentation of the runway as seen from the display viewed from aircraft 11.

Figure 2A:
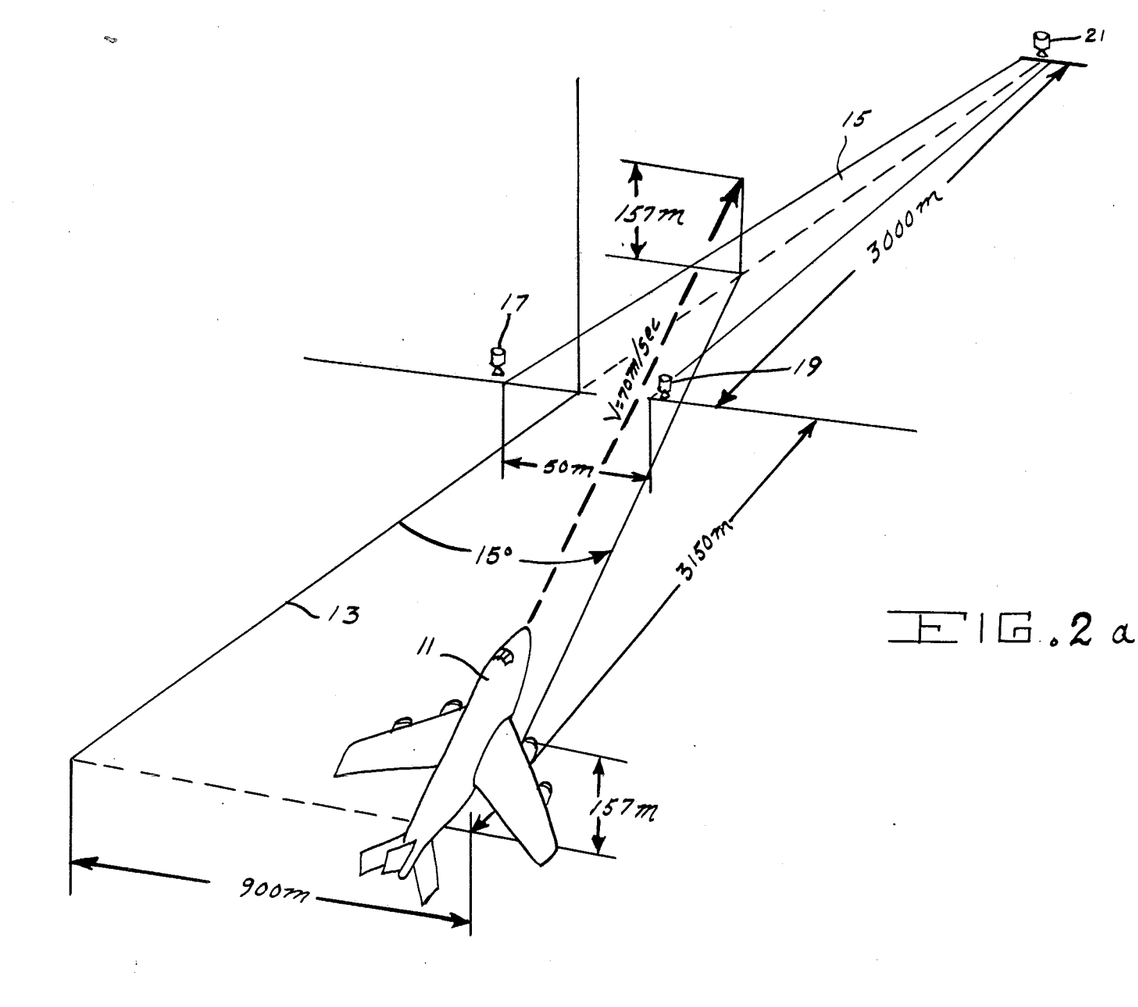
FIG. 2a is a perspective view of an aircraft in an overflight and at an angle to the runway.
Figure 2B:
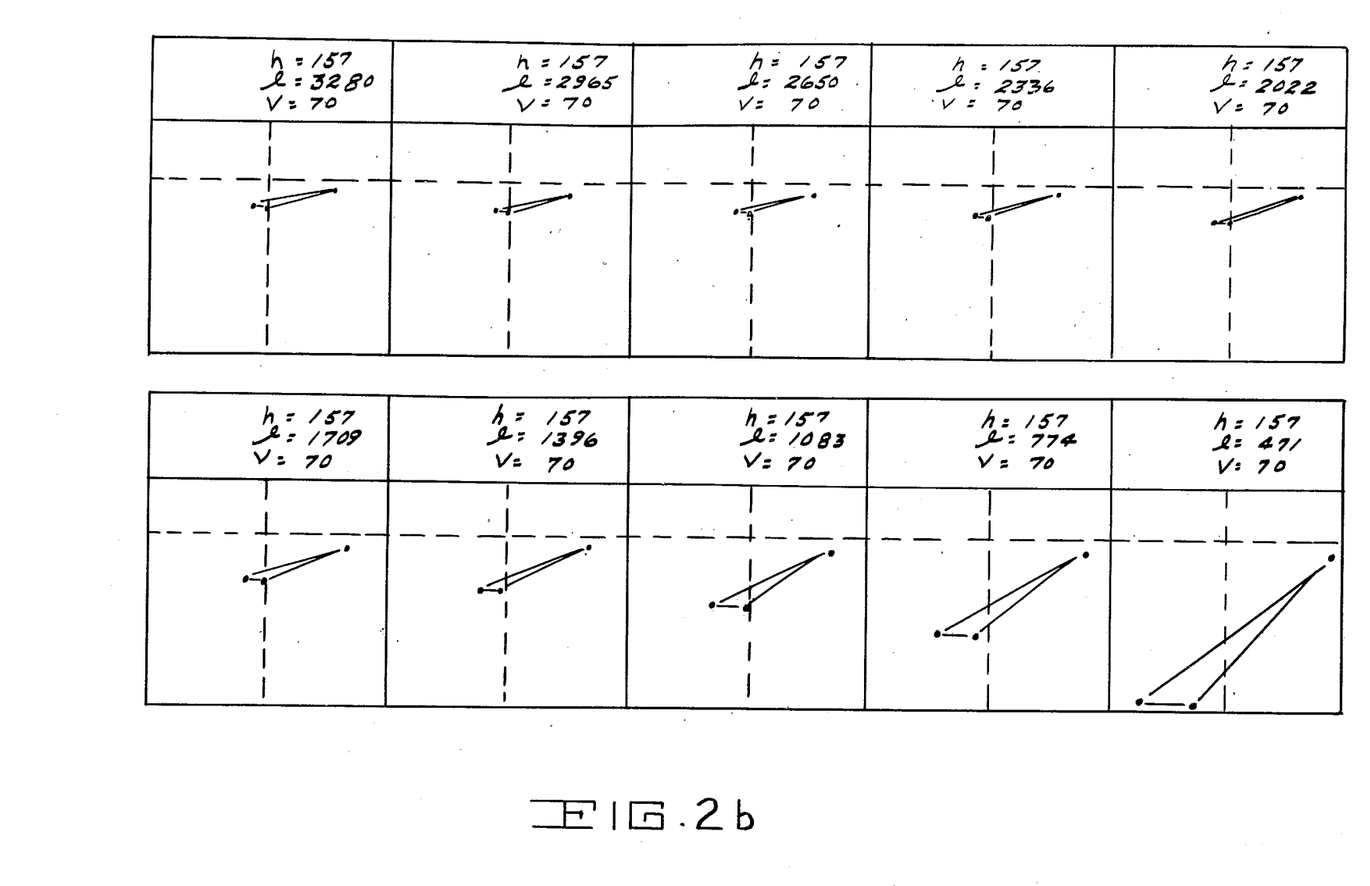

FIG. 2a is a perspective view of aircraft 11 approaching runway 15 in overflight 15° from center line 13 at constant height of 157 meters and a constant velocity of 70 meters per second. FIG. 2b shows progressive views as seen on a display from aircraft 11 of the approach as shown in FIG. 2a.

Figure 3A:
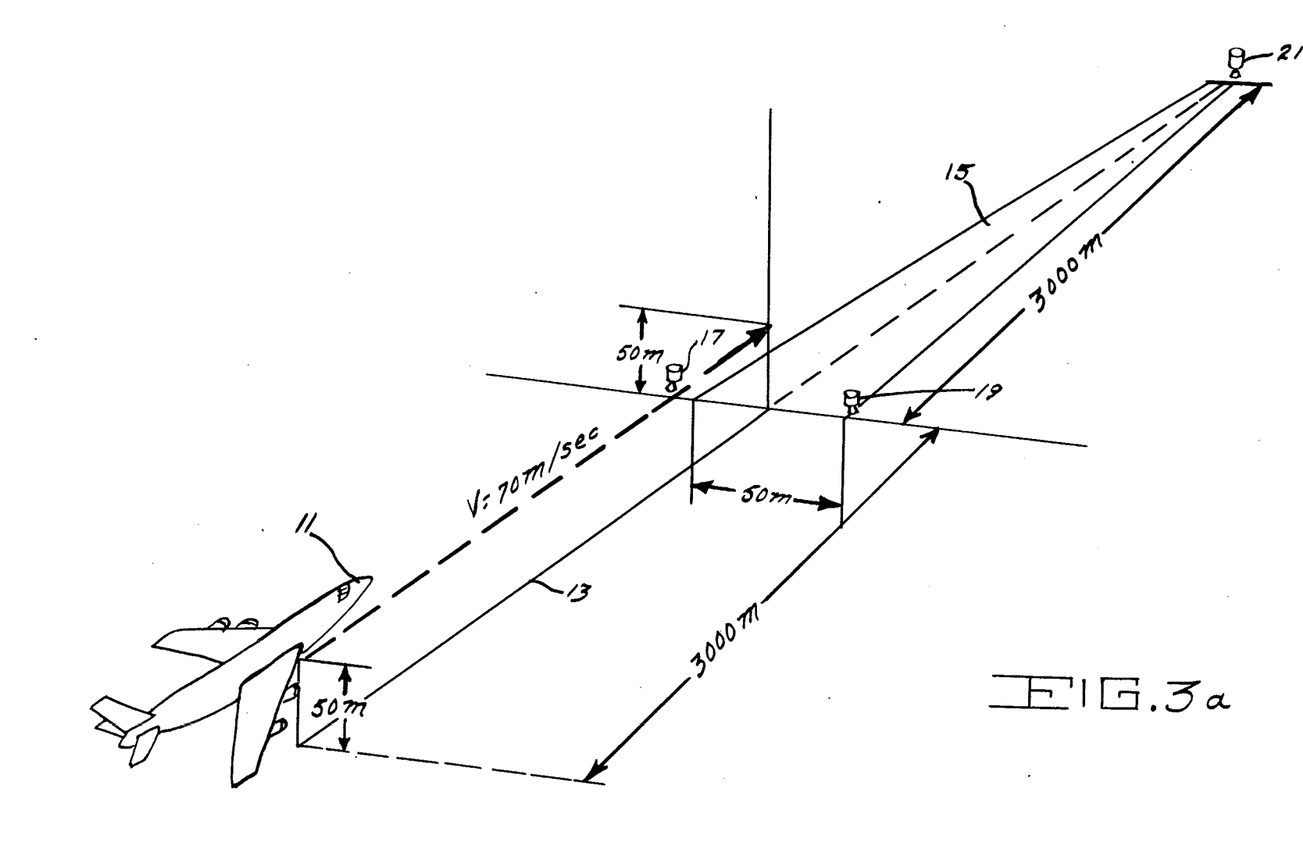
FIG. 3a is a perspective view of an aircraft in overflight but approaching on the center line of the runway.
Figure 3B:
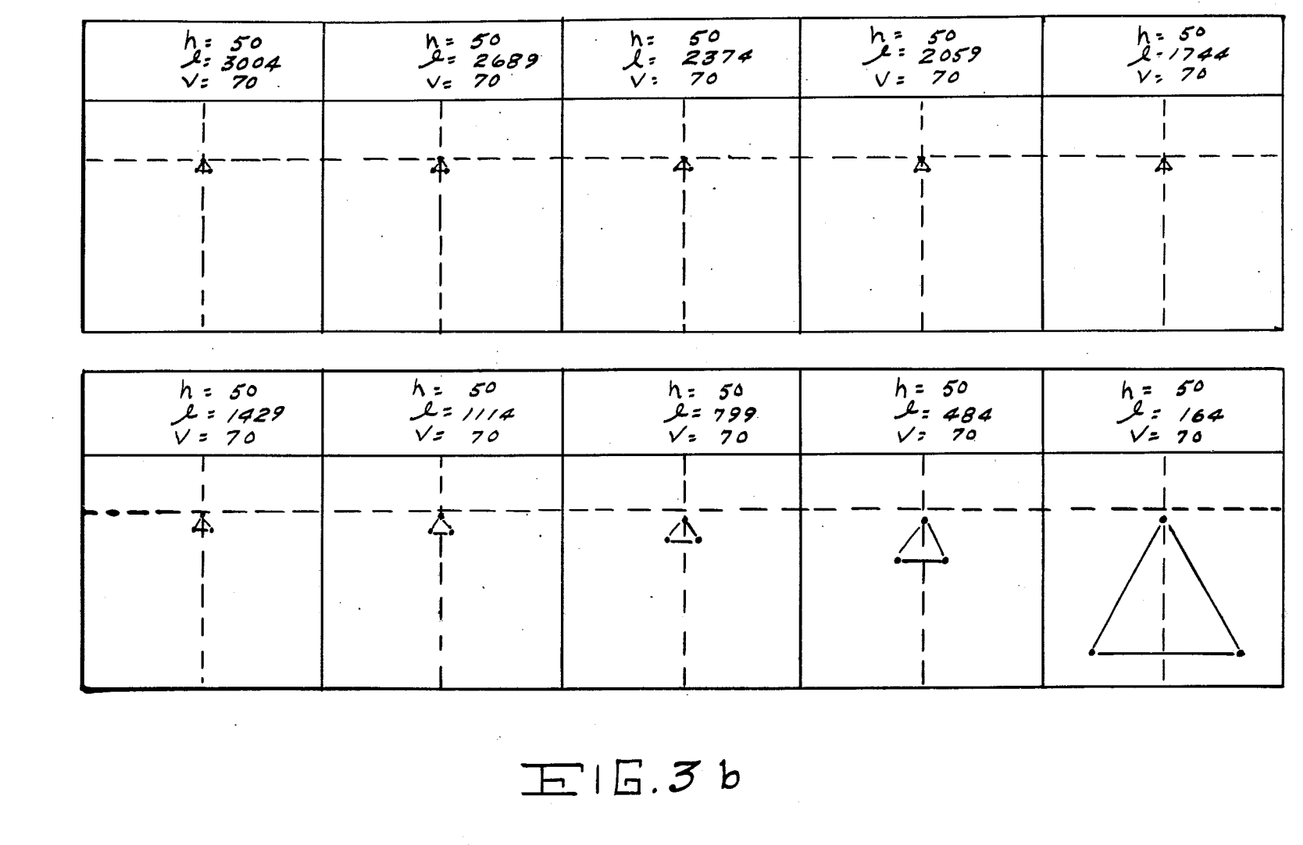

FIG. 3a is a perspective view of aircraft 11 approaching runway 15 on center line 13 but in an overflight at a height of 50 meters and a constant velocity of 70 meters per second. FIG. 3b shows progressive views as seen on a display from aircraft 11 of the approach as shown in FIG. 3a.

Figure 4A:
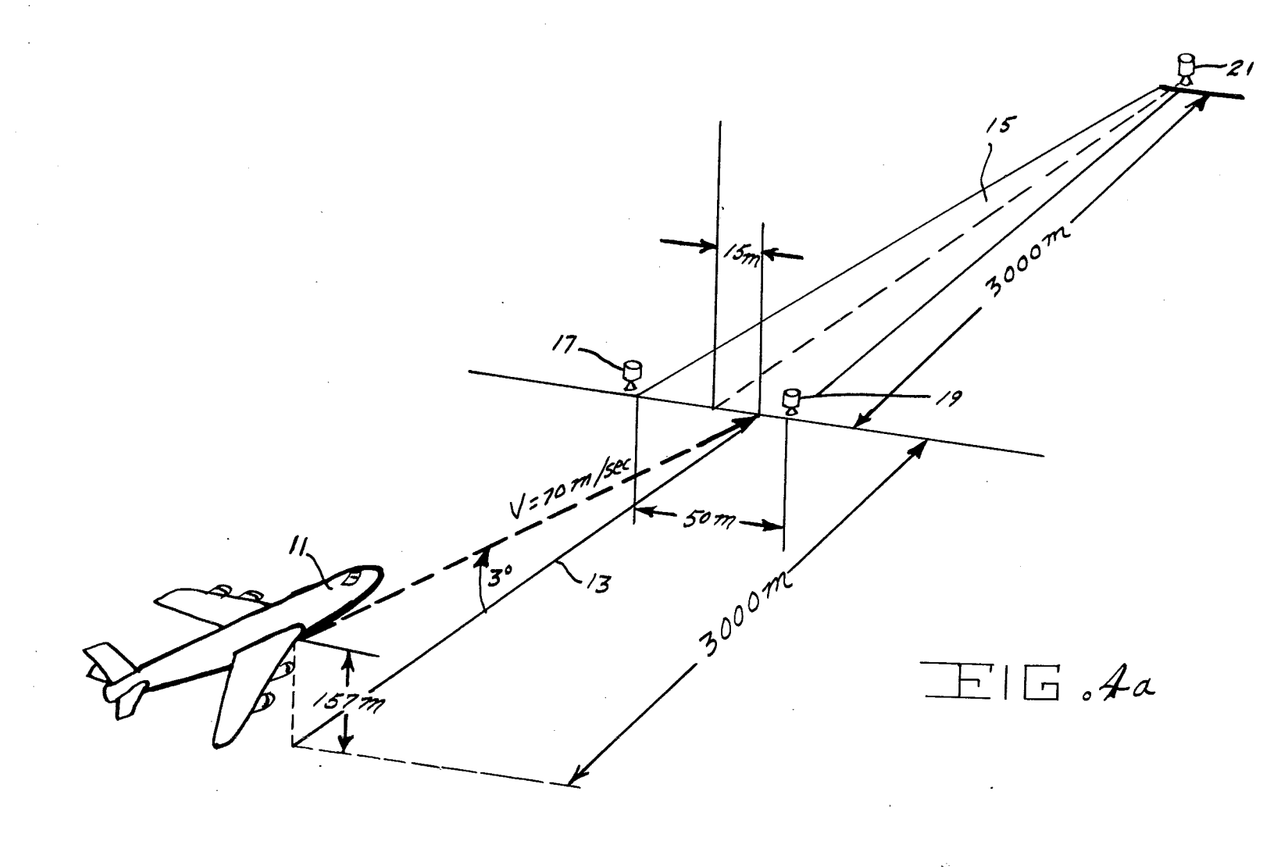
FIG. 4a is a perspective view of an aircraft in a missed approach, parallel but 15 meters off the center line of the runway.
Figure 4B:
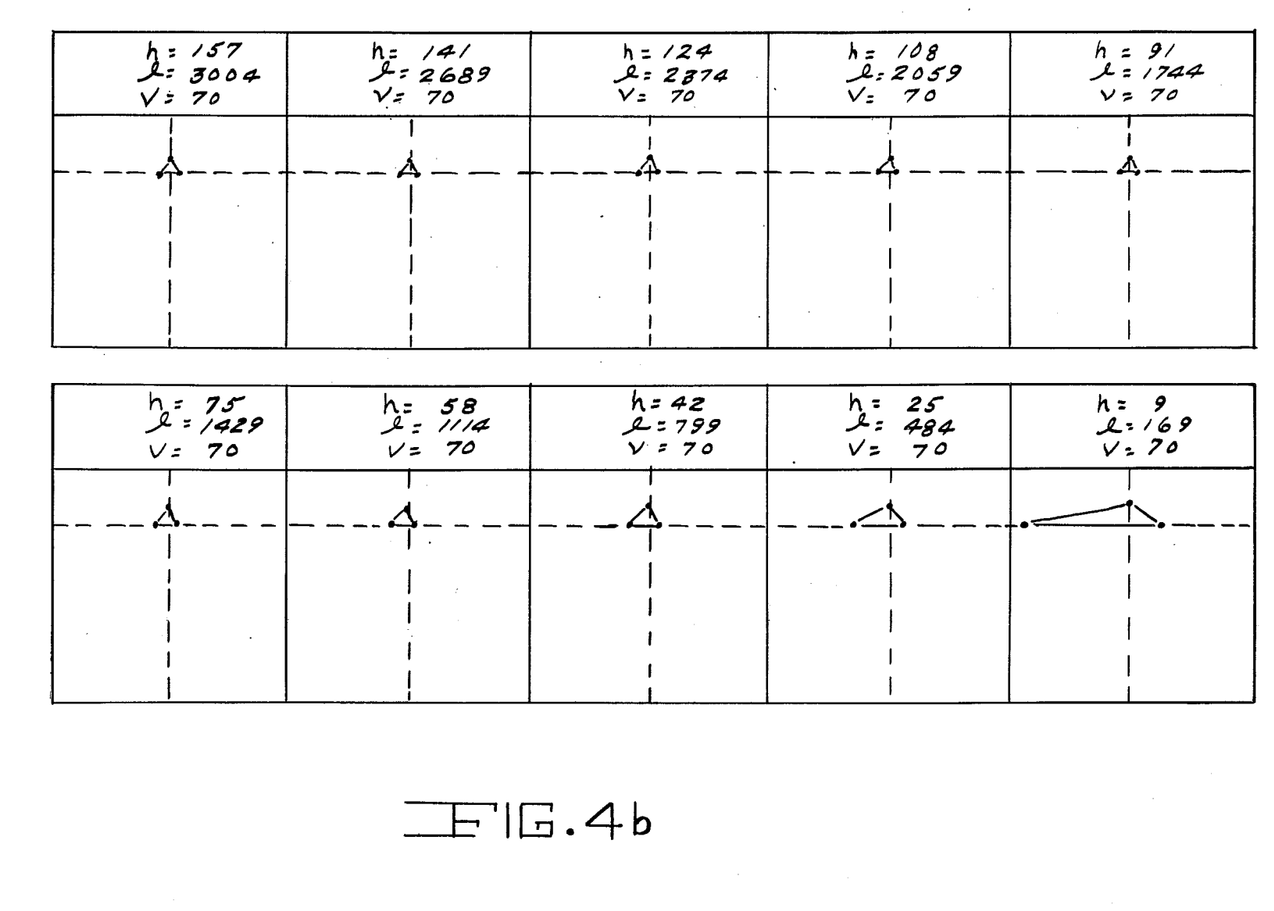

FIG. 4a is a perspective view of aircraft 11 approaching runway 15 in a missed approach and 15 meters off center line 13 with a 3° glide slope at a constant velocity of 70 meters per second. FIG. 4b shows progressive views seen on display of aircraft 11 of the approach as shown in FIG. 4a.

The three markers transmit continuous-wave signals of frequency $f$, $f + \Delta f$, and $f - \Delta f$, respectively, where $f + \Delta f$ and $f - \Delta f$ can be generated as sidebands of the carrier frequency $f$. The operation of this navigation system depends on a straight, constant-velocity sensor motion for at least a time interval of $2\Delta t$ or $3\Delta t$, during which doppler measurements are conducted.

It may be assumed that frequencies $f + \Delta f$ and $f - \Delta f$ are transmitted from the markers at the near end of the runway, $f$ is transmitted from the far end. The frequency spacing $\Delta f$ has to be larger than the maximum doppler shift anticipated for the moving sensing system in order to prevent signal interference. However, a single frequency can be transmitted from the markers but in sequence.

Figure 5:
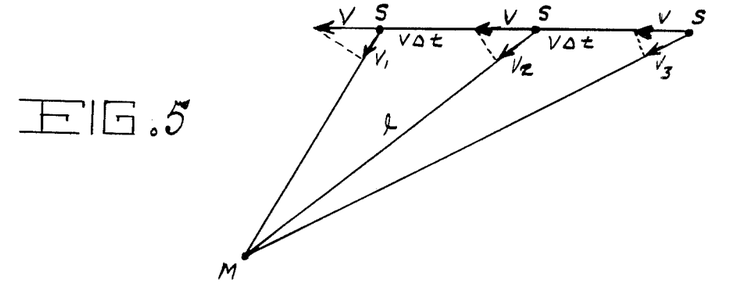
FIG. 5 shows basic geometric relationships of one scheme for obtaining formulas for computing sensor velocity and marker-sensor separation.

FIG. 5 illustrates on basic principle, which can be used to identify the relative position and velocity of a marker M transmitting a constant-frequency signal $f$ and a sensor S moving with constant velocity $v$ and receiving the doppler shifted signal $f'$ from M. Assume that component velocities $v_1$, $v_2$, $v_3$ can be measured at three instances of time and that these measurements are spaced by time intervals $\Delta t$. The radial velocity component $v_i$ is computed from the received doppler shifted signal $f_i'$ $$v_i = c(f_i'/f - 1)$$

where $c$ is the propagation velocity.

The sensor velocity $v$ follows from $$\frac{2}{\sqrt{(v/v_2)^2 - 1}} = \frac{1}{\sqrt{(v/v_3)^2 - 1}} + \frac{1}{\sqrt{(v/v_1)^2 - 1}}$$

This equation is solved iteratively. The marker-sensor separation MS, while measuring $v_2$ is $$l = \frac{v^2 \Delta t}{v_2 - \sqrt{\frac{v^2 - v_2^2}{v^2 - v_1^2}} \cdot v_1} \text{ or}$$

$$l = \frac{v^2 \Delta t}{v_3 \cdot \sqrt{\frac{v^2 - v_2^2}{v^2 - v_3^2}} - v_2}$$

If desired, $l$ can be determined at the positions where $v_1$ or $v_3$ are measured.

Figure 6:
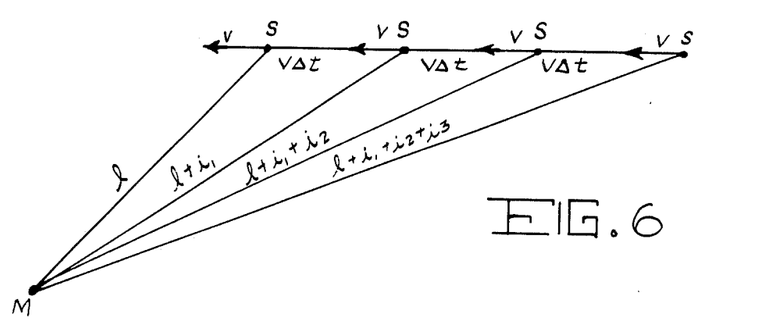
FIG. 6 shows basic geometric relationships of a second scheme for obtaining formulas for computing sensor velocity and marker-sensor separation.

A second scheme, shown in FIG. 6 yields the sensor velocity $v$ and the marker-sensor separation MS by measuring the change $i_i$ of this separation through the integration of the instantaneous doppler shift $f'$ over time intervals $\Delta t$, $$i_i = \int_{\Delta t} (f'/f - 1) dt .$$

If $i_1$, $i_2$, $i_3$ are measured, the velocity v can be calculated from the equation $$v = \frac{1}{\sqrt{2} \Delta t} \sqrt{i_1^2 + i_2^2 + \frac{(i_2 - i_1)(i_1^2 + 3i_2^2 - (i_2 + i_3)^2)}{i_1 - 2i_2 + i_3}}$$

The marker-sensor separation MS is derived from $$l = \frac{2v^2 \Delta t^2 + 2 i_1^2 - (i_1 + i_2)^2}{2(i_2 - i_1)} .$$

Any of the distances MS in FIG. 6 could have been specified as $l$.

Figure 7:
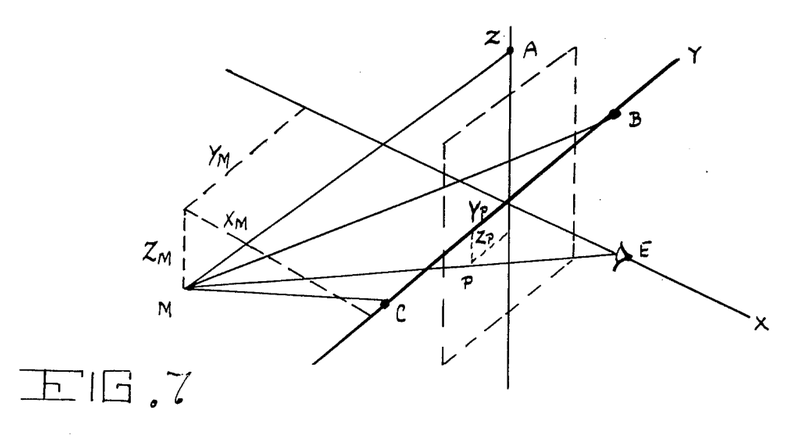
FIG. 7 is a diagram showing the relationships in determining the coordinates for a perspective display.

In FIG. 7, an on board reference system is shown, which is rigidly connected to the navigating vehicle. In case of an aircraft, for example, the $x$ axis might be parallel to the longitudinal axis of the aircraft. The $y$ and $z$ axes might be parallel to the transverse and vertical axes of the aircraft. It is assumed that three identical sensors (antennas) A, B, and C are mounted on the aircraft at positions A = O, O, $s$; B = O, $-s$, O; and C = O, $s$, O.

With either of the schemes described, the velocity v and distances $l_A$, $l_B$, $l_C$ can be determined by three doppler measurements of the signal arriving at each of the antennas A, B, C. When the appropriate trigonometric relationships are evaluated, the marker coordinates in terms of the on board reference system are $$x_M = -\sqrt{l_A^2 - y_M^2 - (z_M-s)^2} y_M = \frac{l_B^2 - l_C^2}{4s} z_M = \frac{l_B^2 + l_C^2 - 2l_A^2}{4s}$$

For simplicity consider the yz plane as a projection plane, with the navigator's eye placed at $E = a, O, O$. The marker position $x_M, y_M, z_M$ then projects into the yz plane with coordinates $$y_P = \frac{ay_M}{a-x_M} \quad z_P = \frac{az_M}{a-x_M}.$$

Many other positions and orientations of the triangular arrangement of sensors (antennas) A, B, C and the projection plane/observer configuration can be realized, resulting generally in more complicated mathematics.

Figures 8A, 8B:
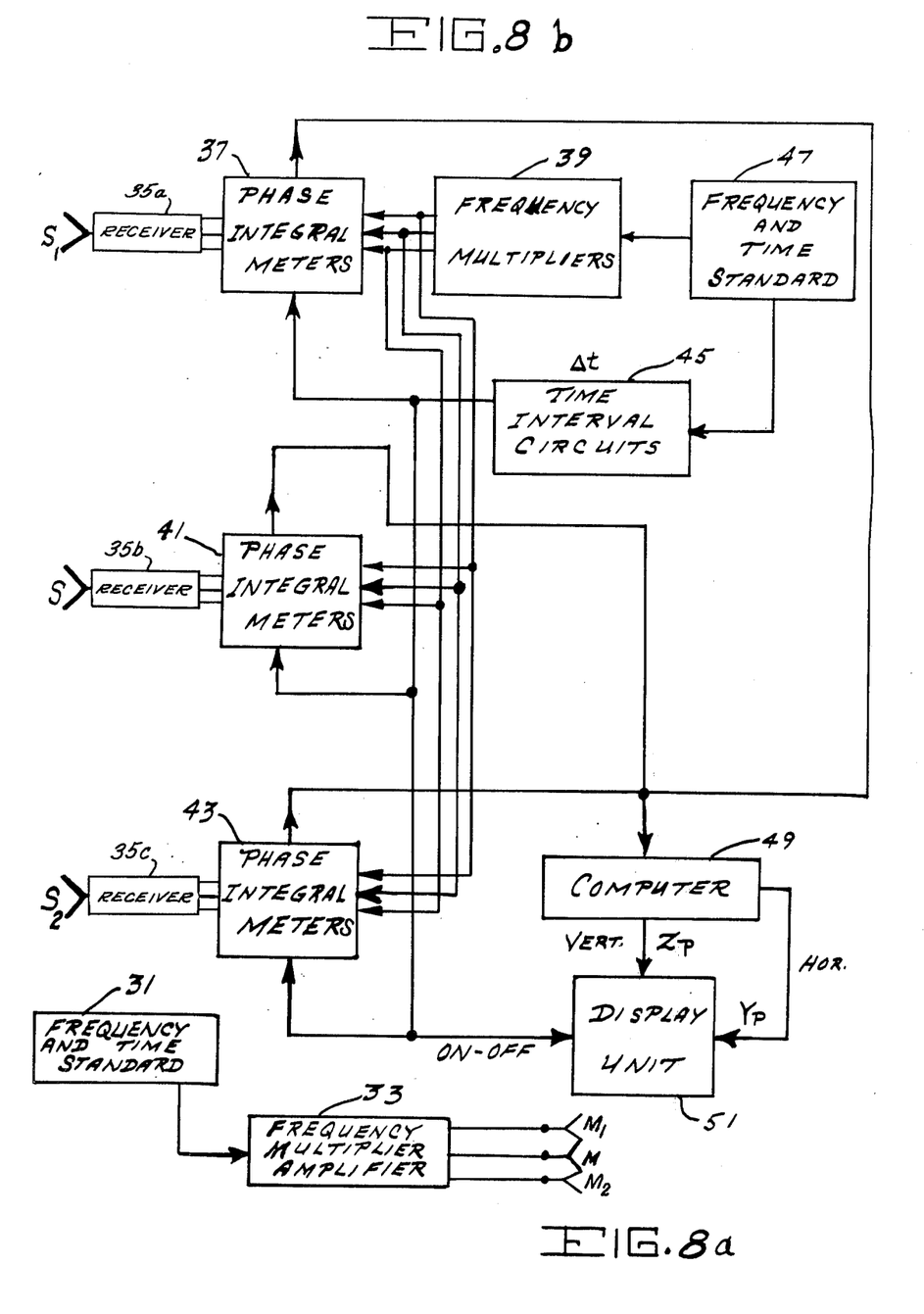
FIGS. 8a and 8b are block diagrams showing an embodiment of the invention.

An embodiment of the perspective navigation system is shown in FIGS. 8a and 8b in block diagram form. The ground based equipment as shown in FIG. 8a includes frequency and time standard 31 which could be a crystal oscillator. The signal having frequency $f$ is derived through conventional frequency multiplier and amplifier circuits 33 and transmitted from antenna M. Frequencies $f + \Delta f$ and $f - \Delta f$ could be generated as sidebands of the carrier frequency f and be transmitted from antennas $M_1$ and $M_2$ after amplification, or they could be generated by separate transmitters with appropriate frequency offsets of the oscillators 31. A single frequency could be transmitted from the markers but it would be in sequence as controlled by any appropriate switching circuit (not shown).

When using separate frequencies the signals received by the on board antennas S, $S_1$, and $S_2$, as shown in FIG. 8b are fed to receivers 35a, 35b and 35c, which are tuned to frequencies $f, f + \Delta f$ and $f - \Delta f$. The receivers are connected one each to three (one for each frequency) phase integral meters which have the function to determine the total phase difference accumulating between two input signals during the time interval $\Delta t$. Such a phase integral meter is manufactured by Hewlett-Packard, Model H-P 5360A. Signals from $S_1$ and the reference frequencies $f, f+\Delta f$, and $f-\Delta f$ from, frequency multiplier 39 are fed to phase integral meters collectively designated as 37; signals from S and frequency multiplier 39 are fed to phase integral meters collectively designated as 41, and signals from $S_2$ and frequency multipliers 39 are fed to phase integral meters collectively designated as 43. Time interval circuits 45 provide timing signals to phase integral meters 37, 41, 43 and are derived from frequency and time standard 47 which also feeds frequency multiplier 39. Outputs from phase integral meters 37, 41 and 43 are processed in computer 49 and are viewed in display unit 51. A display unit could be an oscilloscope with horizontal plus vertical inputs from computer 49 and on-off control or activating signal from time interval circuits 45.

In principle this system will operate at any frequency in the electromagnetic spectrum and can also make use of acoustic waves. Practical considerations such as signal attenuation, required accuracy, technology problems, etc., will decide the most desired frequency.

What is claimed is:

1. A system for displaying a perspective scene having three markers as viewed from a moving remote reference frame comprising:
  a. means for transmitting a signal having a reference frequency $f$ from one marker and signals from the other markers having reference frequencies $f+\Delta f$ and $f-\Delta f$;
  b. a reference frequency signal source at the remote reference frame having frequencies $f, f+\Delta f$, and $f-\Delta f$;
  c. first, second and third means for sensing each of the transmitted signals, with the sensing means including means for distinguishing the signals by frequency and with the first, second and third sensing means having a predetermined spacing at the remote reference frame;
  d. a first plurality of measuring means, measuring the phase difference between the sensed signals from the first sensing means and the respective signals from the reference frequency source;
  e. a second plurality of measuring means, measuring the phase difference between the sensed signals from the second sensing means and the respective signals from the reference frequency source;
  f. a third plurality of measuring means, measuring the phase difference between the sensed signals from the third sensing means and the respective signals from the reference frequency source;
  g. means for computing the radial and angular positions of each marker with respect to the reference frame, the computing means being fed by the first, second and third pluralities of measuring means; and
  h. means for displaying the positions fed by the computing means.

2. A system for displaying a perspective view according to claim 1 which further comprises time interval means for controlling the sequence for sensing the signals.

3. A system for displaying a perspective view according to claim 2 wherein the means for displaying the positions comprise an oscilloscope having vertical and horizontal inputs fed by the computing means and an activating signal from the time interval means.

4. A method of displaying a perspective representation of an object from a remote and linearly moving reference frame comprising:
  a. transmitting a reference signal having frequency $f$ and reference signals having frequencies $f+\Delta f$ and $f-\Delta f$ from beacons positioned about the object;
  b. sensing the transmitted signals from first, second and third sensors positioned on the moving reference frame;
  c. phase comparing the sensed signals from the first sensor with signals from a reference frequency source located on said moving reference frame;
  d. phase comparing the sensed signals from the second sensor with the signals from the reference frequency source located on said moving reference frame;
  e. phase comparing the sensed signals from the third sensor with the signals from the reference frequency source located on said moving reference frame;
  f. computing perspective position coordinates based on the phase comparing; and
  g. displaying the perspective position coordinates.

* * * * *

UNITED STATES PATENT OFFICE
CERTIFICATE OF CORRECTION

PATENT NO. : 3,952,309
DATED : April 20, 1976
INVENTOR(S) : Uve H W Lammers

It is certified that error appears in the above—identified patent and that said Letters Patent are hereby corrected as shown below:

Cover sheet, delete "/73/ Assignee: The United States of America as represented by the Secretary of the Air Force, Washington, D.C."

Signed and Sealed this

Thirty-first Day of August 1976

[SEAL]

Attest:

RUTH C. MASON
Attesting Officer

C. MARSHALL DANN
Commissioner of Patents and Trademarks